United States Patent [19]
DeMarco

[11] Patent Number: 5,920,959
[45] Date of Patent: Jul. 13, 1999

[54] RELEASABLE LOCKING PIVOT MEMBER FOR USE IN HIGH HUMIDITY ENVIRONMENTS

[76] Inventor: Giuseppe DeMarco, c/o 185 Trowers Road, Units 7 and 8, Woodbridge, Ontario, Canada, L4L 5Z5

[21] Appl. No.: 09/021,811

[22] Filed: Feb. 11, 1998

[30] Foreign Application Priority Data

Feb. 18, 1997 [CA] Canada ................................ 2197842

[51] Int. Cl.⁶ ........................................................ E05D 7/10
[52] U.S. Cl. ............................. 16/257; 16/386; 411/512; 403/288
[58] Field of Search .......................... 16/257, 381, 380, 16/383, 368–371, 386; 411/352, 353, 512, 517; 285/211, 220, 141.4, 338; 403/288, 361, 326

[56] References Cited

U.S. PATENT DOCUMENTS

| | | |
|---|---|---|
| Re. 32,846 | 1/1989 | Sandberg et al. . |
| 738,503 | 9/1903 | Waters . |
| 2,323,400 | 7/1943 | Jacobi . |
| 2,368,611 | 1/1945 | Charnock . |
| 3,138,188 | 6/1964 | Tuozzo et al. . |
| 4,137,603 | 2/1979 | Kvasnes . |
| 4,241,541 | 12/1980 | Van Klompenburg . |
| 4,304,408 | 12/1981 | Greenawalt ........................... 411/353 |
| 4,593,431 | 6/1986 | Sandberg et al. . |
| 5,082,390 | 1/1992 | Balsells ................................... 403/326 |
| 5,429,396 | 7/1995 | Guest ...................................... 403/326 |

FOREIGN PATENT DOCUMENTS

| | | |
|---|---|---|
| 282171 | 4/1952 | Switzerland . |
| 242130 | 11/1925 | United Kingdom . |
| 385121 | 12/1932 | United Kingdom . |
| 480416 | 2/1938 | United Kingdom . |
| 759078 | 10/1956 | United Kingdom . |
| 1188550 | 4/1970 | United Kingdom . |
| 1332913 | 10/1973 | United Kingdom . |
| 1542633 | 3/1979 | United Kingdom . |
| 2020347 | 11/1979 | United Kingdom . |
| 2081803 | 2/1982 | United Kingdom . |

*Primary Examiner*—Chuck Y. Mah
*Attorney, Agent, or Firm*—Riches, McKenzie & Herbert

[57] ABSTRACT

A locking pivot member for mounting on a first member and which releasably holds a second member in a coupled pivotal relation thereto. The locking pivot includes a generally cylindrical body portion which is elongated along an axis from a free end portion to a mounted end portion which is secured to the first member. The cylindrical body is further provided with a radially and inwardly extending peripheral groove at a distance spaced axially towards the free end portion and from the first member. A continuous O-ring made of plastic rubber, teflon or other resiliently deformable material is positioned in the peripheral groove. The O-ring is formed having an inner diameter approximately equal to that of the innermost diameter of the radial groove, and an outer diameter greater than that of the remainder of the cylindrical body. The pivot is inserted through an opening in the second member which has a diameter marginally greater than the diameter of the cylindrical body, but which is less than the outermost diameter of the O-ring. When coupled, the cylindrical body extends through the opening so that the second member is pivotable about the axis of the pivot but which is retained against withdrawal by engagement with the O-ring.

19 Claims, 3 Drawing Sheets

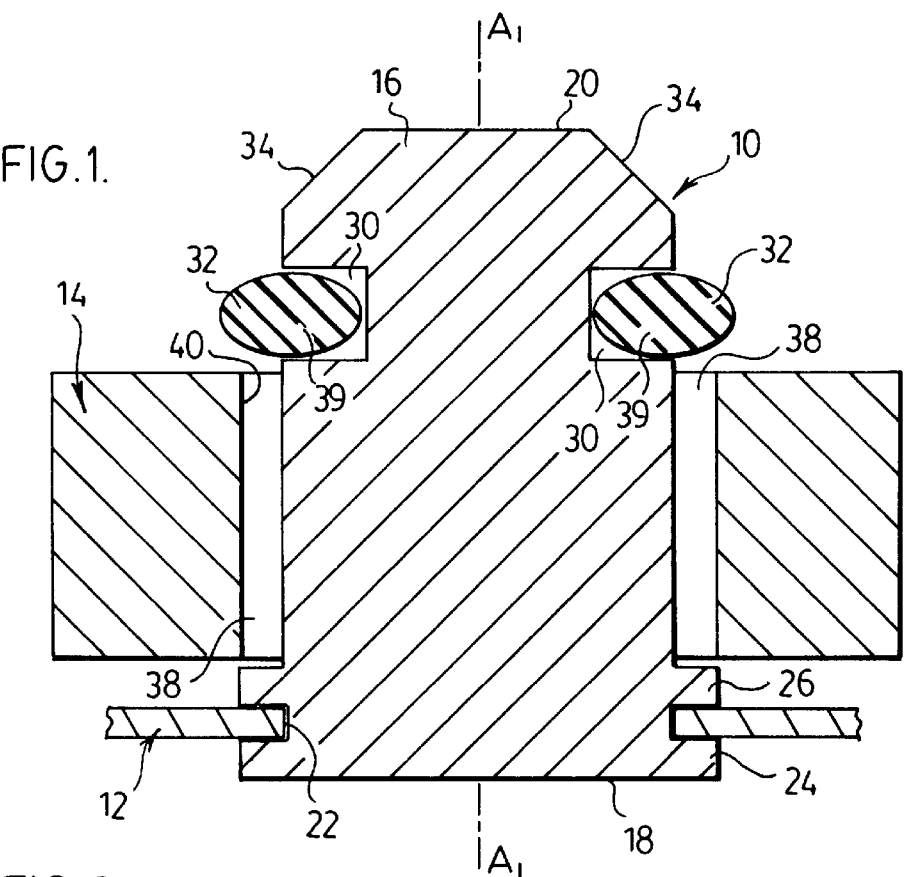
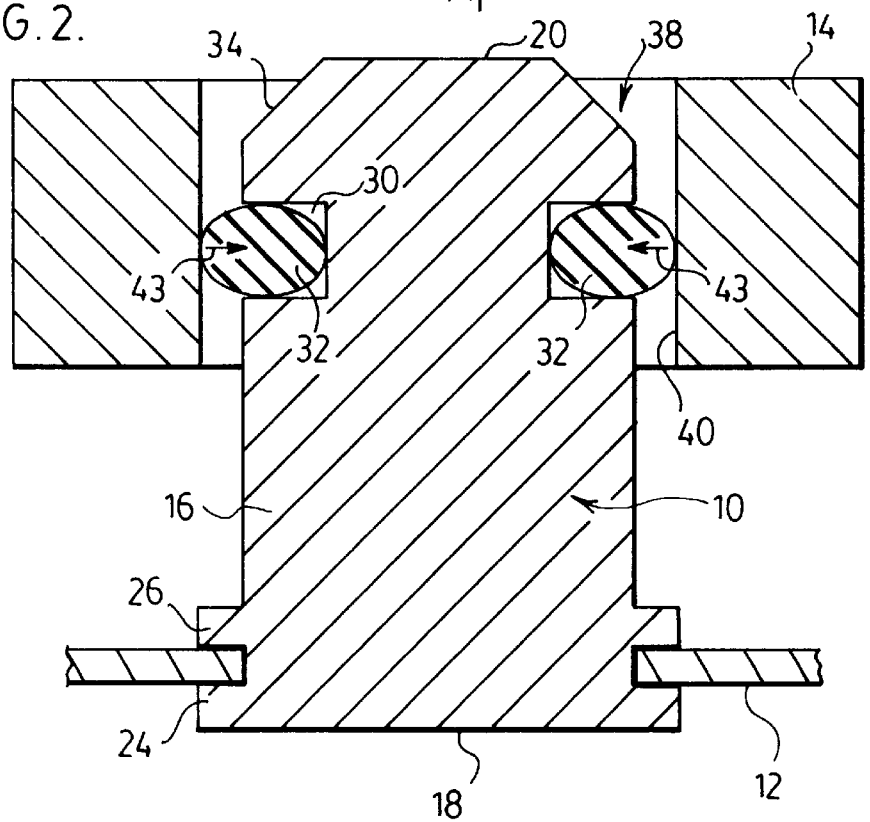

1 …

RELEASABLE LOCKING PIVOT MEMBER FOR USE IN HIGH HUMIDITY ENVIRONMENTS

BACKGROUND OF THE INVENTION

The present invention relates to a locking member for releasably coupling first and second members in a pivotable relationship, and more particularly, to a locking pivot member for use in marine, coastal, and other high humidity environments where premature corrosion of the pivot member and/or coupled members occurs.

BACKGROUND OF THE ART

Numerous different types of hardware are known for releasably and pivotally connecting two members, as for example are used in window hardware and the like. Typically, the pivotal connection is achieved by inserting a cylindrical stud which is secured to one member through a complementary sized hole formed in a second member. A metal cotter pin or clip is then slid through a bore formed in a portion of the stud which projects above the second member to prevent the withdrawal of the stud. Conventional stud coupling members have suffered the disadvantage in that the insertion and removal of the metal clip increases manufacturing time and costs, and is further susceptible to damage if removal should later become necessary.

Where releasable fasteners are to be used to secure boat covers or cowls in place, or on window hardware for use in coastal areas, it is known to provide corrosive-resistant metal platings on the connecting hardware to prevent corrosion. It has been found, however, that conventional hardware for pivotally coupling two members is susceptible to premature corrosion and failure when used in such corrosive environments. In particular, metal-on-metal contact on sliding the kotter pin into the bore and the coupling and uncoupling of the members tends to scratch away portions of the protective coating and expose the unprotected underlying metal. The exposed underlying metal thereafter rapidly corrodes creating an unsightly appearance. In addition, the corrosion will ultimately weaken the hinge structure leading to corrosion embrittlement and fatigue, and ultimately the failure of the pivot.

In one attempt to overcome the disadvantages of increased manufacturing time associated with conventional window hardware, U.S. Pat. No. 4,593,431 to Sandberg et al discloses the use of a snap stud which incorporates a spring steel C-ring to retain the window hardware members in a coupled orientation. In use, the spaced apart ends of the C-ring move inwardly towards each other as the other member is slid on top of and off of the stud. It has been found, however, that when the steel C-ring locking members are used in corrosive environments, the hardware suffers premature corrosion and ultimately the failure of the pivot locking member. In particular, it has been found that the free ends of the C-ring scratch the insides of the bore formed through the other coupled member. The scratching of second member by the C-ring is compounded by the fact that the ends of the C-ring resiliently engage the sides of the bore as it moves through the second member. Because of its resiliency, the C-ring tends to return to its uncompressed orientation, thereby urging each of its open ends against the second member. The difficulties of scratching is compounded by the fact that the spring steel of the C-ring typically has a greater hardness than the protective coatings.

SUMMARY OF THE INVENTION

To at least partially overcome the disadvantages of the prior art devices, the present invention provides a pivot locking member which releasably and pivotally couples two members without the use of a spring wire or other metal retaining spring or pin.

Another object of the invention is to provide hardware to secure two members together by the engagement of one member against an annular non-metallic O-ring which is mounted to a stud, and which enables the separation and assembly of the members relative to each other by the elastic deformation of the O-ring as the member is moved therepast.

A further object of the invention is to provide a releasable locking pivot member for use in releasably coupling two members having an anti-corrosive coating or plating, and which minimizes the likelihood that the coating or plating may become scratched during coupling and uncoupling of the members.

Another object of the invention is to provide a pivot locking stud which incorporates a plastic or rubber keeper member which is not susceptible to corrosion.

A further object of the invention is to provide a snap stud construction for pivotably and releasably securing two members together and which includes a retaining member constructed so as to minimize metal-on-metal contact, abrasion and/or scoring as the members are moved relative to each other as they are coupled or uncoupled.

The present invention provides a locking pivot or stud for mounting on a first member and which releasably holds a second member in a coupled pivotal relation thereto. The locking stud includes a generally cylindrical body portion which is elongated along an axis, extending from a mounted end portion which is secured to the first member to a free end portion. The cylindrical body is further provided with a radially and inwardly extending peripheral groove at a distance spaced axially towards the free end portion and from the first member.

A continuous O-ring made of plastic, rubber, teflon or other resiliently deformable material is positioned in the peripheral groove. Most preferably the O-ring is made from 355 barometer water resistant urethane which resists degradation even after prolonged exposure to high humidity environments or even submersion in water. The O-ring is formed having an inner diameter approximately equal to that of the innermost diameter of the radial groove, and an outer diameter greater than that of the remainder of the cylindrical body. In this manner, the O-ring is coupled to the cylindrical body located within the radially extending groove with its radially outwardmost edge extending beyond the periphery of the body.

The groove may be formed as a parabolic or semi-circular shaped channel extending about the cylindrical body, but more preferably is formed as a generally rectangular channel with sidewalls which extend radially inwardly parallel to each other. In cross-section, the O-ring may be circular or have a somewhat flattened elliptical shape. An elliptical shape which is elongated in a radial direction from the body axis is preferable as it advantageously facilitates the deformation of the outermost peripheral portion of the ring inwardly into the groove.

The second member is coupled to the first through its engagement with the O-ring. The second member is provided with a circular opening which has a diameter which is marginally greater than the diameter of the cylindrical body of the locking stud, but which is less than the outermost diameter of the O-ring. When coupled, the cylindrical body extends through the opening so that the second member is pivotable about the axis of the stud. The stud is normally retained against axial withdrawal from the opening by the engagement of the outer periphery of the O-ring with the second member. To separate the members, additional load force is applied axially on the cylindrical body. The load force in turn urges the outer periphery of the O-ring into contact with the second member until the peripheral most edge of the O-ring deforms, moving inwardly towards the groove as it is slid axially past the second member.

In a preferred embodiment, the present invention provides for a releasable connection device for use in high humidity or other such corrosive environments. The locking pivot may, for example, be used to releasably secure boat covers and tarpaulins, boat ladders and the like, as well as for use in pivotally connecting window hardware members together used on boats or buildings in coastal areas. Further, one or more of the members and/or the pivot body may be provided with an anti-corrosive coating or plating to inhibit corrosion. Suitable coatings would include plastic and/or polyurethane and acrylic coatings. Platings would include zinc or nickel electroplating.

Accordingly in one aspect the present invention resides in a releasable connection means for pivotally coupling first and second members, the connection means comprising a generally cylindrical portion having an outer periphery, end portions and an external peripheral groove intermediate the end portions, and an O-ring having an open center and comprising a resiliently compressible material positioned in said peripheral groove, means attaching the cylindrical portion to said first member so that the cylindrical portion and said first member are fixed against relative movement axially of the cylindrical portion, said second member having a through opening having a diameter greater than the diameter of the outer periphery of the cylindrical portion, said cylindrical portion extending through said opening, said O-ring having inner and outer diameters selected to have a part thereof in said peripheral groove and a part extending beyond the outer periphery of the cylindrical portion, when said O-ring is in an undeformed position, the diameter of at least a portion of the through opening of the second member being less than the outer diameter of the O-ring, and said O-ring being resiliently deformable into said groove to a release position to enable disassembly of said first and second members by pulling one member axially away from the other.

In another aspect, the present invention resides in a window hinge having a releasable pivot, said pivot including a cylindrical portion with an outer periphery, said window hinge comprising, a guide track for connection to a sill of a window frame, a slider movably mounted in the guide track, a sash arm for attachment to a window sash and having an end operatively connected to the slider, a support arm having a through opening, means fixedly attaching the cylindrical portion to the guide track, said cylindrical portion extending through said opening and releasably holding said support arm in pivotal relation with said guide track, said cylindrical portion having an external peripheral groove intermediate the ends of the cylindrical portion, and an O-ring of a resiliently compressible material defining an open center with an inward radial edge positioned in said peripheral groove, said O-ring having inner and outer diameters selected to have a part thereof in said peripheral groove and a part extending beyond the periphery of said cylindrical portion when said O-ring is in a retention position, the diameter of at least a portion of said through opening of the support arm being less than the outer diameter of the O-ring and greater than the diameter of said circular centerline of the O-ring when the O-ring is in said retention position, and said peripheral groove having a depth to enable radial inward compression of the O-ring to a release position in which the O-ring is compressed radially inwardly into said peripheral groove and which enables disassembly of said support arm and guide track by pulling one of the support arm and guide track away from the other of the support arm and guide track axially of the pivot.

In a further aspect the present invention resides in a releasable connection means for pivotally coupling a first metal member and second metal member, the connection means comprising, a generally cylindrical portion having an outer periphery, end portions and an external peripheral groove intermediate the end portions, and an O-ring having an open center and comprising a resiliently compressible material positioned in said peripheral groove, said O-ring having inner and outer diameters selected to have an inner part thereof in said peripheral groove and an outer part extending beyond the outer periphery of the cylindrical portion, means attaching the cylindrical portion to said first member so that the cylindrical portion and said first member are fixed against relative movement axially of the cylindrical portion, said second member having a bore therethrough, said bore having a diameter greater than a diameter of the outer periphery of the cylindrical portion, said cylindrical portion extending through said bore, said O-ring being resiliently deformable from an undeformed position to a deformed release position, wherein in said undeformed position, the diameter of at least a portion of the bore being less than the outer diameter of the O-ring, and in said deformed position said outer part of the O-ring being compressed at least partially radially inwardly to enable disassembly of said first and second members by pulling one member axially away from the other, and wherein on disassembly, the outer part of the O-ring engages the second member to substantially prevent contact between said cylindrical portion and said second member as the members are moved axially.

In another aspect the present invention resides in a window hinge having a releasable pivot, said pivot including a cylindrical portion with an outer periphery, and an O-ring, said window hinge comprising, a metal guide track for connection to a sill of a window frame, a slider movably mounted in the guide track, a sash arm for attachment to a window sash and having an end operatively connected to the slider, a metal support arm having a portion defining a through opening, means fixedly attaching the cylindrical portion to the guide track, said cylindrical portion extending through said opening and releasably holding said support arm in pivotal relation with said guide track, said cylindrical portion having an external peripheral groove, said groove spaced axially of the cylindrical portion from the guide track a distance greater than a thickness of the support arm portion defining said through opening, said O-ring comprising a resiliently compressible material and defining an open center and including, an inward radial edge portion positioned in said peripheral groove to substantially prevent movement of said O-ring axially along said cylindrical portion, an outer radial edge portion which is resiliently deformable from a retention position to a release position, wherein in said retention position the outer radial edge portion having a radial diameter greater than a diameter of said through opening, and wherein the diameter of the through opening is greater than the diameter of a circular centerline of the O-ring, and in said release position, the outer radial edge portion of the O-ring is compressed radially inwardly to enable disassembly of said support arm and guide track by pulling one of the support arm and guide track away from the other, and where during disassembly the outer radial edge portion of the O-ring engages the support arm portion defining the through opening to substantially prevent contact between the support arm and cylindrical portion.

BRIEF DESCRIPTION OF THE DRAWINGS

Further objects and advantages of the invention will appear from the following drawings taken together with the accompanying drawings in which:

FIG. 1 is a cross-sectional view of a releasable locking pivot in accordance with a first embodiment of the invention showing a first and second member in a pivotally coupled arrangement;

FIG. 2 a cross-sectional view of the locking pivot of FIG. 1 showing the uncoupling of the second member therefrom;

DETAILED DESCRIPTION OF THE INVENTION

Figure 3:
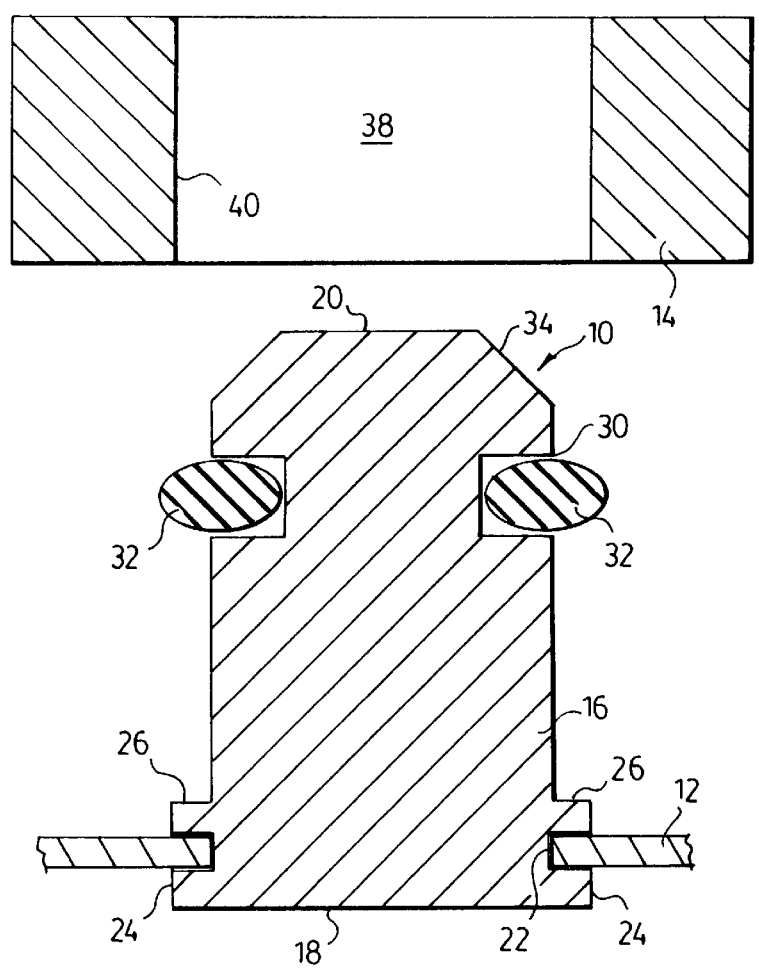
FIG. 3 is a cross-sectional view of the locking pivot of FIG. 1 with the second member removed.

Reference is first made to FIGS. 1 to 4 which show a releasable locking pivot 10 in accordance with a first embodiment of the invention. As will be described hereafter, the pivot 10 is for use in releasably securing together two members 12,14 in an arrangement pivotal to each other. Both of the members 12,14 are made of metal such as brass or steel, and are provided with a corrosive resistant zinc plating for enhanced corrosion resistance and increased lifespan.

The pivot 10 includes a generally cylindrical body 16 made of brass. The body 16 has a radial diameter of about 5 mm and which extends longitudinally along axis $A_1$-$A_1$ a distance of about 10 mm from an end portion 18 mounted to member 12 to a free end portion 20. Numerous methods of mounting the body 16 to the member 12 are possible. FIG. 1 shows one possible mounting method wherein the end portion 18 of the body 16 is secured within an opening 22 formed through the member 12 by a spaced, radially extending rim 24 and flange 26. The rim 24 and flange 26 are integrally formed with the remainder of the body 16. The pivot 10 is secured to the member 12 with the member 12 captive between the rim 24 and flange 26. The flange 26 advantageously acts as a bearing surface which maintains the member 14 a distance spaced axially from the member 12 during the pivotal movement of the members 12,14 relative to each other.

A generally rectangular groove 30 extends inwardly and radially about the body 16 adjacent the free end portion 20. The groove 30 has a width in the direction of axis $A_1$-$A_1$ of between about 1 to 2 mm, and more preferably about 1.5 mm. The groove 30 extends radially inwardly towards the axis $A_1$-$A_1$ a depth of about 1 mm.

An O-ring 32 of resiliently deformable water resistant urethane is positioned in the groove 30. As seen best in FIGS. 1 and 4, when unbiased, the O-ring 32 is elliptical in cross-section and is marginally elongated in a radial direction. The O-ring 32 has an inner diameter $d_1$ selected so as to be permanently retained against axial movement within the grove 30, and more preferably which is approximately equal to the diameter of the body 16 across the groove 30. The outer diameter $D_1$ of the O-ring 32 is slightly larger than that of the cylindrical body 16 with the result that the O-ring 32 projects radially outwardly beyond the body 16 a distance of about 0.5 mm.

FIG. 1 shows the member 14 coupled to the member 12 via the pivot 10 with the member 14 pivotal about the axis $A_1$-$A_1$. The portion of the member 14 which is pivotally coupled to the pivot 10 includes a bore or opening 38 therethrough. As will be described, the free end portion 20 of the cylindrical body 16 is inserted through the opening 38 to couple the members 12,14 together with the member 14 pivotable about the axis $A_1$-$A_1$ relative to member 12. The opening 38 has a radial diameter selected greater than that of the cylindrical body 16 but less than that of the outermost diameter $D_1$ of the O-ring 32 when it is not deformed.

Figure 4:
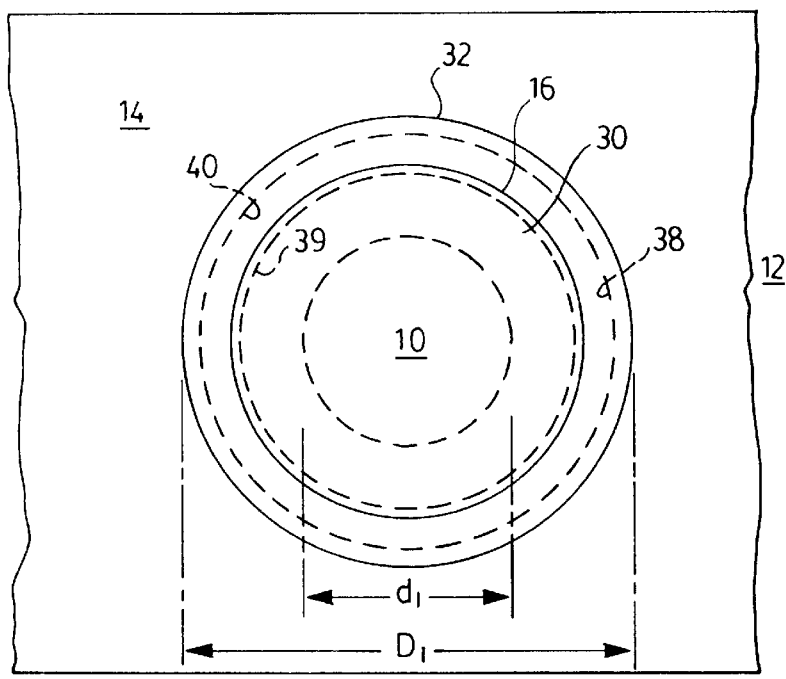
FIG. 4 shows a schematic top view of the releasable locking pivot of FIG. 1 with the O-ring positioned in a locking orientation.
Figure 5:
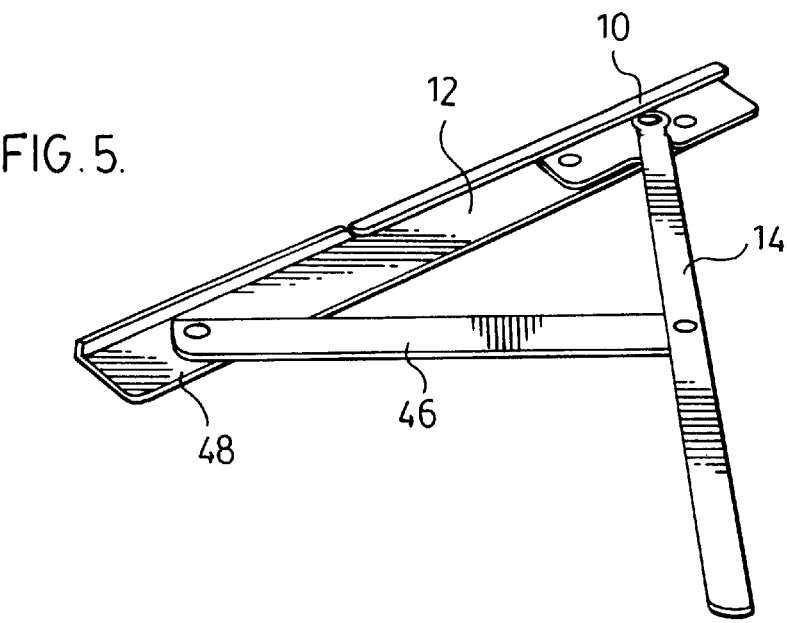
FIG. 5 shows a perspective view of a window hinge using the releasable locking pivot of FIG. 1.

More preferably as shown best in FIG. 4, the radial diameter of the opening 38 is greater than the diameter of the centerline 39 of the O-ring 32, when the O-ring 32 is in an undeformed position. The centerline 39 preferably locates radially inwardly a marginal distance into the groove 30.

Although not essential, FIGS. 1 to 3 show the free end 20 of the cylindrical body 16 as further including a bevelled edge portion 34 to assist in guiding the insertion of pivot 10 through the opening 38.

As shown in FIG. 1, the groove 30 is formed in the body 16 at a position spaced axially from the flange 26 a distance greater than the thickness of the member 14 at the opening 38.

FIGS. 1 and 4 show the O-ring 32 in a retention position, wherein the O-ring 32 assumes an undeformed state with its radial outermost part thereof projecting beyond the periphery of both the body 16 and the opening 38 in the member 14. The side 40 of the opening 38 is cylindrical and forms upper and lower circular ends or edges. In the cross-section shown in FIG. 1, the side 40 defines a substantially perpendicular surface which seats against the O-ring 32 to prevent the sliding of the member 14 axially past the O-ring 32. In this position, the abutment of the member 14 with the O-ring 32 under normal forces prevents the relative movement of the pivot 10 axially out of the opening 38 and maintains the members 12,14 in a pivotally coupled arrangement.

The action of the O-ring 32 on either the release or the initial retention of the member 14 in a pivotally interconnected relationship is shown best in FIG. 2. As the member 14 is slid axially over the body 16 and increased load forces are applied, the O-ring 32 is compressed radially inwardly in the direction of arrows 43 by its engagement with the member 14. The O-ring 32 compresses towards a position within the peripheral groove 30, whereby the member 14 can move axially to and from the retained position. The action of the member 14 in compressing the O-ring 32 is facilitated by the caming action derived from the rounded profile of the radial outwardmost portion of the O-ring 32.

With the present invention, the members 12,14 can be connected merely by forcing the member 14 downwardly about the body 16 of the pivot 10. Such movement thereby compresses the O-ring 32, after which when the member 14 is in the fully seated position shown in FIG. 1, the O-ring 32 resiliently returns to a retention position to maintain the members 12,14 in a pivotally coupled relation.

It is to be appreciated that because a continuous O-ring 32 is provided as the coupling member, there are no wire ends which may otherwise scratch the anti-corrosive plating on the members 12,14. In addition, because the O-ring 32 is made from urethane, the O-ring 32 acts as a spacer between the body 16 and the wall 40. As such, there is no metal-on-metal contact during the fastening and release of the members 12,14. It is to be appreciated that the absence of metal-on-metal contact, and the elimination of scratching of the respective members 12,14 makes the present invention particularly suitable for use in high humidity, corrosive environments such as marine applications, as well as in residential applications in oceanic coastal areas.

Figure 6:
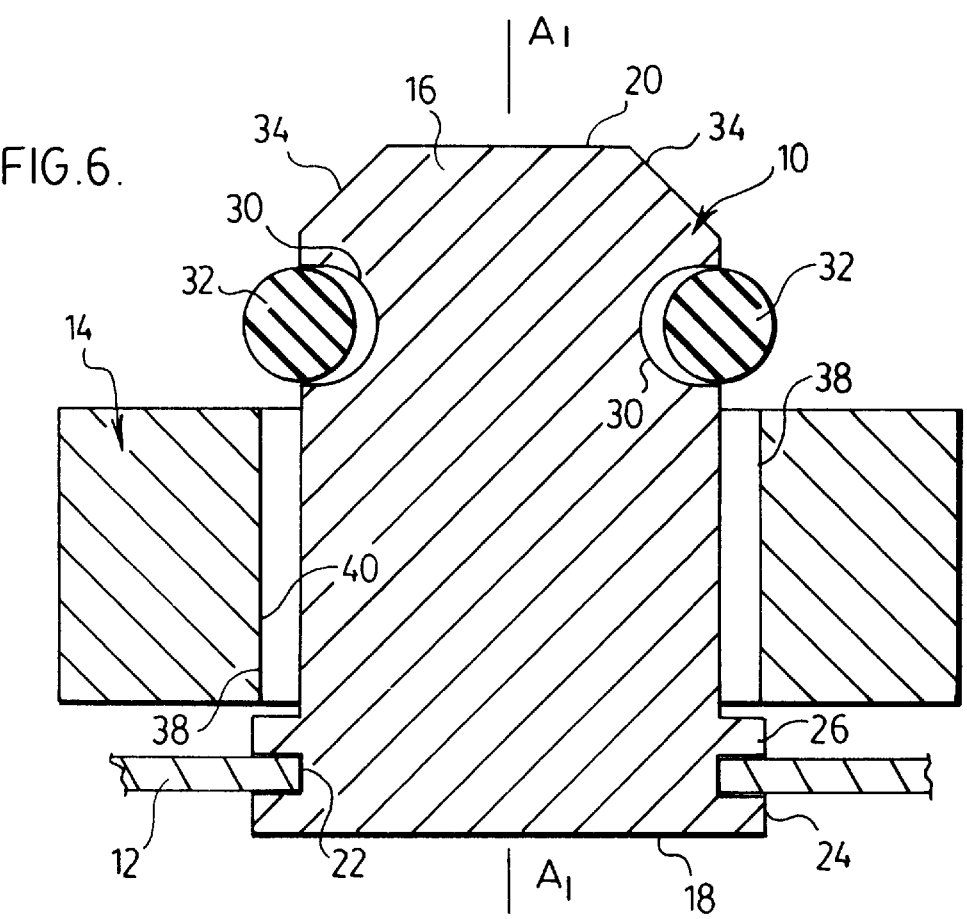
FIG. 6 shows a locking pivot in accordance with a further aspect of the invention.

FIG. 6 shows one embodiment of the invention wherein like reference numerals are used to identify like components. In FIG. 6, the releasable pivot 10 is used to pivotably couple hardware members 12,14 of a window hinge.

The window hinge includes a guide track 12 which is mountable to the sill of a window frame (not shown). A sash arm 46 fastens to the underside of the window sash and at one end is pivoted to a slider member 48 which is slidably movable in the guide track 12. Support arm 14 has one end pivotally connected to the sash arm 46 and its other end pivotally connected to the guide track 12 by means of the locking pivot 10.

The locking pivot 10 functions to releasably retain the support arm 14 and the guide track 12 in a pivotally coupled relationship.

While FIG. 6 shows the pivot 10 and members 12,14 as window hardware, in another embodiment, the member 12 could for example comprise a boat hull, and member 14 comprising a circular ferrule which is provided through an edge seam of a boat cover. In this manner, the locking pivot 10 could be used to releasably secure a boat cover or cowling in place.

While the preferred embodiment of the invention disclosed the use of a urethane O-ring for use as a retaining member, it is to be appreciated that other O-rings made of resiliently deformable materials are also possible. Suitable O-rings would include those made from plastics such as polyethylene and polyurethane, Teflon™, as well as hardened natural or synthetic rubbers.

Although FIGS. 1 to 3 show the use of an O-ring 32 having an elliptical cross-section which is compressible into a rectangular shaped groove 30, O-rings and grooves having a different configuration are also possible and will now become apparent. FIG. 6 shows one possible modified locking pivot 10 in accordance with a further embodiment of the invention, and wherein like reference numerals are used to identify like components.

The locking pivot 10 of FIG. 6 has essentially the same construction as that described with reference to FIGS. 1 to 5, with the exception that the O-ring 32 is circular in cross-section, and the peripheral groove 30 extends inwardly towards the axis $A_1$–$A_1$ to a semi-circular end. To permit deformation of the O-ring 32 into the groove 30 and enable the member 14 to move therepast, the groove 32 is preferably formed having an increased depth and/or an axial length which is slightly larger than that of the O-ring. It is to be appreciated that the use of the locking pivot 10 shown in FIG. 6 is identical to that described with reference to FIGS. 1 to 4.

Although the disclosure describes and illustrates preferred embodiments, the invention is not so limited. Many modifications and variations will now occur to persons skilled in the art. For a definition of the invention, reference may be had to the appended claims.

We claim:

1. In combination, a first metal member, a second metal member and a releasable connection means for pivotally coupling said first metal member and said second metal member, the connection means comprising:

a generally cylindrical portion having an outer periphery, end portions and an external peripheral groove intermediate the end portions, an O-ring having an open center and comprising a resiliently compressible material positioned in said peripheral groove, said O-ring having inner and outer diameters selected to have an inner part thereof in said peripheral groove and an outer part extending beyond the outer periphery of the cylindrical portion, means attaching the cylindrical portion to said first member so that the cylindrical portion and said first member are fixed against relative movement axially of the cylindrical portion, said second member having a bore therethrough, said bore having a diameter greater than a diameter of the outer periphery of the cylindrical portion, said cylindrical portion extending through said bore, said O-ring being resiliently deformable from an undeformed position to a deformed release position, wherein in said undeformed position, the diameter of at least a portion of the bore being less than the outer diameter of the O-ring, and in said deformed position said outer part of the O-ring being compressed at least partially radially inwardly to enable disassembly of said first and second members by pulling one member axially away from the other, and wherein on disassembly, the outer part of the O-ring engages the second member to substantially prevent contact between said cylindrical portion and said second member as the members are moved axially.

2. The combination as defined in claim 1 wherein said O-ring is formed from urethane.

3. The combination as defined in claim 2 wherein said O-ring is generally circular in cross-section and said peripheral groove has a width in an axial direction of between about 1 and 2 mm.

4. The combination as defined in claim 1 wherein said peripheral groove defines a section of said cylindrical portion of reduced diameter, and the open center of said O-ring has a diameter approximately equal to that of said cylindrical portion through said groove.

5. The combination as defined in claim 4 wherein said O-ring is generally elliptical in cross-section.

6. The combination as claimed in claim 5 wherein said members are window hardware members.

7. The combination as defined in claim 1 wherein the opening in said second member is defined by a circular edge, said circular edge viewed in a cross-section through said second member defining substantially a right angle edge for seating against the O-ring.

8. The combination as claimed in claim 7 wherein said members are window hardware members.

9. The combination as claimed in claim 1 wherein said members are window hardware members.

10. The combination as claimed in claim 9 wherein said connection means is for use with a window hinge including a guide track for connection to a sill of a window frame, a slider movably mounted in the guide track, a sash arm for attachment to a window sash and having an end connected to the slider, a support arm having an end pivotally connected to the sash arm and an opposite end connected pivotally to the guide track, and wherein said first member comprises the guide track and said second member comprising the support arm.

11. The combination as defined in claim 1 wherein the means attaching the cylindrical portion to the first member comprises an integral flange and an integral rim in axially spaced relationship thereto, said first member being held captive between the flange and rim and maintained axially spaced from the second member by the flange.

12. The combination as claimed in claim 1 wherein said first and second members include a corrosion resistant plating, and said compressible material is selected from the group consisting of urethane, rubber, polyethylene and polyurethane.

13. The combination as claimed in claim 1 wherein said first and second members include a corrosion resistant coating, and said compressible material is selected from the group consisting of urethane, rubber, polyethylene and polyurethane.

14. A window hinge having a releasable pivot, said pivot including a cylindrical portion with an outer periphery, and an O-ring, said window hinge comprising, a metal guide track for connection to a sill of a window frame, a slider movably mounted in the guide track, a sash arm for attachment to a window sash and having an end operatively connected to the slider, a metal support arm having a portion defining a through opening, means fixedly attaching the cylindrical portion to the guide track, said cylindrical portion extending through said opening and releasably holding said support arm in pivotal-relation with said guide track, said cylindrical portion having an external peripheral groove, said groove spaced axially of the cylindrical portion from the guide track a distance greater than a thickness of the support arm portion defining said through opening, said O-ring comprising a resiliently compressible material and defining an open center and including, an inward radial edge portion positioned in said peripheral groove to substantially prevent movement of said O-ring axially along said cylindrical portion, an outer radial edge portion which is resiliently deformable from a retention position to a release position, wherein in said retention position the outer radial edge portion having a radial diameter greater than a diameter of said through opening, and wherein the diameter of the through opening is greater than the diameter of a circular centerline of the O-ring, and in said release position, the outer radial edge portion of the O-ring is compressed radially inwardly to enable disassembly of said support arm and guide track by pulling one of the support arm and guide track away from the other, and where during disassembly the outer radial edge portion of the O-ring engages the support arm portion defining the through opening to substantially prevent contact between the support arm and cylindrical portion.

15. The hinge as defined in claim 14 wherein said O-ring is formed from water resistant urethane.

16. The hinge as defined in claim 14 wherein said O-ring is generally circular in cross-section and said peripheral groove has an axial length of between about 1 and 2 mm.

17. The hinge as defined in claim 14 wherein said O-ring is generally elliptical in cross-section.

18. The hinge as defined in claim 15 wherein said O-ring is generally elliptical in cross-section.

19. The hinge as defined in claim 14 wherein the support arm further comprises a corrosion resistant coating or plating.

* * * * *